United States Patent Office 3,796,690
Patented Mar. 12, 1974

3,796,690
METHOD FOR THE PREPARATION OF WATER-INSOLUBLE THERMOSETTING COMPOSITIONS OF MATTER FROM SUBSTITUTED ACRYLAMIDE AND AN ALDEHYDE
Eugene Richard Farone, Mentor, Ohio, assignor to The Lubrizol Corporation, Wickliffe, Ohio
No Drawing. Continuation-in-part of abandoned application Ser. No. 98,485, Dec. 15, 1970. This application Mar. 14, 1973, Ser. No. 341,216
Int. Cl. C08g 3/00, 9/20
U.S. Cl. 260—64       11 Claims

ABSTRACT OF THE DISCLOSURE

Water-insoluble thermosetting resinous compositions of matter are prepared by heating an N-3-oxohydrocarbon-substituted acrylamide (preferably diacetone acrylamide) with an aldehyde or with a water-soluble condensation product of such aldehyde with said acrylamide, at a temperature high enough to liquefy the reaction mass and for a period of time sufficient to remove substantially all volatile components therefrom. The molar ratio of aldehyde to substituted acrylamide in the mixture is at least 1:1. Preferably, temperatures up to about 200° C. are employed. The products may be used in molding compositions and to replace unsaturated polyesters in the preparation of impregnated glass fiber mats, laminates and the like.

---

This application is a continuation-in-part of copending application Ser. No. 98,485, filed Dec. 15, 1970, now abandoned.

This invention relates to a method for the preparation of polymeric compositions of matter. More particularly, it relates to an improvement in a method for preparing water-insoluble thermosetting resinous compositions by reacting reagents A and B, wherein reagent A is a substituted acrylamide of the formula

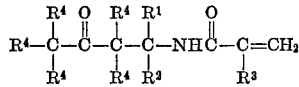

wherein each $R^4$ is individually hydrogen or a hydrocarbon or substituted hydrocarbon radical, at least one $R^4$ being hydrogen; each of $R^1$ and $R^2$ is hydrogen or a hydrocarbon or substituted hydrocarbon radical; and $R^3$ is hydrogen, halogen or a lower alkyl or substituted lower alkyl radical; and reagent B is at least one of (1) an aliphatic aldehyde containing no more than 4 carbon atoms and (2) a water-soluble composition prepared by reacting said aldehyde with reagent A in the presence of an alkaline reagent and in a diluent comprising water, an organic liquid which is a solvent for the reactants or the product of said reaction or both, or a mixture of said diluents; the molar ratio of reagent B to reagent A being such that at least one mole of said aldehyde is available per mole of said substituted acrylamide;

said improvement comprising heating a mixture comprising said reagents A and B at a temperature high enough to effect substantial liquefaction of the reaction mixture, for a period of time sufficient to effect removal of water and substantially all other volatile components therefrom by distillation.

The preparation of water-insoluble thermosetting polymeric compositions of matter by the reaction of an aldehyde with an N-3-oxohydrocarbon-substituted acrylamide, especially diacetone acrylamide, is described in U.S. Pat. 3,518,326 and U.S. Reissue Pat. 27,328. The disclosures of these patents are hereby incorporated by reference herein. According to the patents, the reaction is effected by mixing the two reagents in the presence of a strongly alkaline reagent and in a suitable solvent. The preferred solvents are water and polar organic solvents; when water is used, the product precipitates therefrom, and when polar organic solvents are used it may be precipitated by the addition of water. The compositions thus obtained are useful for the preparation of molding powders and as replacement for unsaturated polyester resins for typical applications such as preparation of laminates and of resin-impregnated glass fiber mats.

Despite the advantages of the thermosetting compositions described in the above-noted patent, they are not presently in wide use. One reason for this is the inconvenience attending the precipitation and recovery of the product from the aqueous or other solvent medium. The required additional process steps increases the expense of preparing the composition and therefore increase its cost.

A principal object of the present invention, therefore, is to provide a method for the preparation of thermosetting resinous compositions of matter.

A further object is to provide an improved method for preparing water-insoluble reaction products of N-3-oxohydrocarbon-substituted acrylamides with aldehydes.

Still another object is to provide a method for preparing compositions suitable for use as thermosetting molding powders and in other applications for thermosetting resins.

Other objects will in part be obvious and will in part appear hereinafter.

Reagent A in the method of this invention is an N-3-oxohydrocarbon-substituted acrylamide as represented by the above formula and definitions. The term "hydrocarbon radical" as used in said definitions includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

The following are illustrative of hydrocarbon radicals within the scope of this invention. Where a named radical has several isomeric forms (e.g., butyl), all such forms are included.

| | |
|---|---|
| Methyl | Tolyl |
| Ethyl | Xylyl |
| Propyl | Benzyl |
| Butyl | Cyclohexyl |
| Hexyl | Cyclopentyl |
| Octyl | Methylcyclopentyl |
| Decyl | Cyclopentadienyl |
| Vinyl | Vinylphenyl |
| Allyl | Isopropenylphenyl |
| Ethynyl | Cinnamyl |
| Propargyl | Naphthyl |
| Phenyl | |

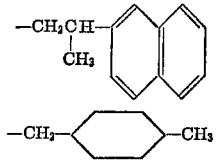

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention. By "substituted" is meant radicals containing substituents which do not alter significantly the character or reactivity of the radical. Examples are:

Halide (fluoride, chloride, bromide, iodide)
Ether (especially lower alkoxy)
Keto
Carboxy
Ester (especially lower carbalkoxy)
Aminoacyl (amide)
Nitro
Cyano
Thioether
Sulfoxy
Sulfone In general, no more than about three such substituent groups will be present for each 10 carbon atoms in the radical.

The hydrocarbon or substituted hydrocarbon radicals in the compounds used as reagent A are usually free from ethylenic and acetylenic unsaturation and have no more than about 30 carbon atoms, desirably no more than about 12 carbon atoms. They are preferably lower hydrocarbon radicals, the word "lower" denoting radicals containing up to seven carbon atoms. Still more preferably, they are lower alkyl or aryl radicals, most often alkyl. In most instances, all five of the $R^4$ radicals are hydrogen; $R^1$ and $R^2$ are lower alkyl radicals; and $R^3$ is hydrogen or methyl.

The preparation of N-3-oxohydrocarbon-substituted acrylamides which may be used as reagent A in the method of this invention is described in U.S. Pat. 3,277,056 and 3,425,942. The preferred components are diacetone acrylamide, diacetone methacrylamide and diacetophenone acrylamide, with diacetone acrylamide being especially preferred because of its ready availability and advantageous property. When reference hereinafter is made to diacetone acrylamide, it is to be understood that other N-3-oxohydrocarbon-substituted acrylamides may be substituted therefor when appropriate.

Reagent B may be an aliphatic aldehyde containing no more than 4 carbon atoms, such as formaldehyde, acetaldehyde, propionaldehyde or a butyraldehyde. Of these, formaldehyde is preferred. Reversible polymers of the aldehydes (e.g., paraformaldehyde, trioxane, peraldehyde) may be used in place of the monomeric aldehydes and are equivalents thereof.

Alternatively, reagent B may be a water-soluble reaction product of such aldehyde with the substituted acrylamide used as reagent A. The preparation of these water-soluble products is described in copending applications Ser. No. 833,162, filed June 13, 1969, now abandoned, and Ser. No. 111,676, filed Feb. 1, 1971. Both of these applications are incorporated by reference herein. In general, this reaction is effected in the presence of a strongly alkaline reagent such as an alkali metal or alkaline earth metal hydroxide, alkoxide or amide, a quaternary ammonium hydroxide or the like. The proportion of alkaline reagent should, in general, not exceed about 5 mole percent of the aldehyde used and usually need not be greater than about 1.5 mole percent thereof. The reaction temperature is preferably below about 100° C., usually about 40–90° C., and the mole ratio of aldehyde to diacetone acrylamide, while not critical, is usually between about 1:1 and 8:1, preferably between 1:1 and 4:1. In some instances, the presence of a polymerization inhibitor such as hydroquinone, hydroquinone monomethyl ether or a hindered phenol may be beneficial.

The reaction leading to the water-soluble product used as reagent B is carried out in a diluent comprising water, an organic liquid which is a solvent for the reaction of the products or both, or a mixture of such diluents. Suitable organic diluents include alcohols, especially lower alkanols such as methanol, ethanol, n-butanol, isobutanol and the like; ethers and ether alcohols such as di-n-butyl ether, ethylene glycol monomethyl ether, ethylene glycol dimethyl ether, diethylene glycol monomethyl ether, dioxane and the like; and aromatic hydrocarbons such as benzene toluene and xylene. The lower alkanols are preferred by reason of the fact that they serve as solvents for both the reactants and the products. The same is true of water, and it is particularly preferred to use water alone as the diluent.

The following example illustrates the method for the preparation of a water-soluble diacetone acrylamide-formaldehyde reaction product suitable for use as reagent B. Other examples will be found in the above-noted copending applications incorporated by reference herein.

EXAMPLE 1

To a solution of 644 parts (3.81 moles) of diacetone acrylamide in 681 parts of water, at 31° C., is added, with stirring, 372 parts of 91% paraformaldehyde (11.3 moles based on monomeric formaldehyde). The mixture is heated to 43° C. and 19 parts of a 10% aqueous solution of potassium hydroxide is added. The mixture is further heated, with stirring, to 48–55° C. and maintained at this temperature for two hours. An additional 19 parts of potassium hydroxide solution is then added and stirring is continued for 2 hours, followed by addition of a third 19-ml. portion of potassium hydroxide solution (total 0.87 mole percent based on formaldehyde) and stirring for two more hours. The solution is then cooled to 29° C., 0.044 part of hydroquinone monomethyl ether is added and the mixture is filtered. The product, a 53% aqueous solution of the desired water-soluble composition, contains 3.04% nitrogen.

The relative amounts of reagents A and B used in the method of this invention must be such that at least one mole of aldehyde is available per mole of substituted acrylamide. For the purpose of this invention, aldehyde is deemed "available" when it is added directly (that is, when reagent B is the free aldehyde or reversible polymer thereof) and also when it has already been reacted with reagent A. For example, the method of this invention may be used to prepare a water-insoluble thermosetting resinous composition having a 2:1 molar ratio of formaldehyde to diacetone acrylamide by any of the following methods: (1) reaction of 2 moles of formaldehyde with one mole of diacetone acrylamide; or (2) reaction of paraformaldehyde equivalent to 2 moles of formaldehyde with one mole of diacetone acrylamide; or (3) reaction of 0.5 mole of diacetone acrylamide with one mole of the water-soluble composition of Example 1. In the latter instance, one mole of the composition of Example 1 is deemed to contain 3 moles of formaldehyde and one mole of diacetone acrylamide even though these two compounds have been reacted with each other; thus, the additional 0.5 mole of diacetone acrylamide added provides a 2:1 molar ratio of formaldehyde to diacetone acrylamide.

The method of this invention comprises bringing the two reagents into contact and heating them at a temperature high enough to effect substantial liquefaction of the reaction mixture, for a period of time sufficient to effect removal of substantially all volatile components. These volatile components will include water formed in the reaction and unreacted aldehyde, as well as any solvent or diluent which may be used. Generally, solvents or diluents other than that present in reagent B are not necessary, but it may occasionally be desirable to use an inert diluent such as a hydrocarbon, ether, ester or the like to facilitate control of the reaction at the high temperatures employed. These temperatures may be as high as about 200° C., although it is usually preferred that the maximum temperature be no higher than about 160° C.

According to the method described in the aforementioned U.S. Pat. 3,518,326 and Reissue Pat. 27,328, an alkaline reagent is required to obtain a substituted acrylamide-aldehyde reaction product. No alkaline reagent is necessary to carry out the method of the present invention. However, the presence of such a reagent in small amounts (usually less than about 5 mole percent, based on the amount of aldehyde used) frequently facilitates the reaction. Substances which may be used for this purpose include the strongly alkaline reagents listed above (which are preferred) as well as less strongly alkaline reagents such as alkylamines. Because of their availability and effectiveness, the alkali metal hydroxides are especially preferred. Control of the reaction is frequently facilitated if the alkaline reagent is added in increments, and the reaction temperature during addition should usually be no higher than about 100° C.

The method of this invention is generally carried out by thoroughly blending the two reagents in a suitable reaction vessel, together with any diluent which may be used, and heating the same, with stirring, until liquefaction is complete. The alkaline reagent (if any) is then added, usually in increments during the course of the reaction, and heating and stirring are continued while volatile material is removed by distillation and collected in a suitable receiver. The reaction temperature is increased as necessary to maintain the mixture liquid but remains below about 200° C. since above that temperature the reaction tends to get out of control and decomposition of the reactants or product may occur. When no more volatile material passes over, the reaction mass is allowed to cool to room temperature, whereupon it solidifies. This mass is the desired thermosetting composition and may be recovered without further purification. If further purification is nevertheless necessary, it may be effected by dissolution and reprecipitation or by other known techniques.

The method of this invention, and the compositions produced thereby, are illustrated by the following examples. All parts and percentages are by weight.

EXAMPLE 2

A mixture of 100 parts of the product of Example 1, 28 parts of diacetone acrylamide (providing a mole ratio of formaldehyde to diacetone acrylamide of about 1.7:1) and 0.02 part of hydroquinone is heated on a hot plate for about 3¼ hours, to a final maximum temperature of 193° C. When the removal of volatile materials has ceased as evidenced by a cessation of boiling, the product is removed from the hot plate and cooled, yielding a hard, brittle resin.

EXAMPLE 3

A mixture of 1550 parts of the product of Example 1, 450 parts of diacetone acrylamide (1.24:1 molar ratio of formaldehyde to diacetone acrylamide), 32 parts of water and 0.1 part of hydroquinone monomethyl ether is heated under nitrogen, with stirring, for 10 hours, with volatile material being removed by distillation and collected. The maximum temperature is 132° C. At the end of the heating period, the mixture is removed from the flask and cooled to room temperature, yielding a hard, glassy, clear amber resin having a bromine number of 84.

EXAMPLE 4

Following the procedure of Example 3, a mixture of 1410 parts of the product of Example 1, 380 parts of diacetone acrylamide (for a 1.7:1 molar ratio of formaldehyde to diacetone acrylamide) and 300 parts of petroleum naphtha having a boiling range of about 95–150° C. is heated for about 8 hours, to a maximum temperature of 148° C. At the end of this time, substantially all volatile material has been removed. Upon cooling, there is obtained a bright yellow, brittle solid which is the desired product. It contains 7.07% nitrogen and has a bromine number of 104.

EXAMPLE 5

A mixture of 3052 parts of diacetone acrylamide and 1459 parts of 37% aqueous formaldehyde solution (1:1 mole ratio of formaldehyde to diacetone acrylamide) is heated under nitrogen to 50° C. and a solution of 25.8 parts of sodium hydroxide (3.58 mole percent based on formaldehyde) in 175 parts of water is added in seven increments. The first increment, added at 50° C., causes a substantial exotherm. The other six increments are added at about 82° C. Heating is continued to a maximum final temperature of 148° C., until all volatile materials are removed and the residue is cooled and isolated as the desired product. It contains 2.54 percent nitrogen and has a bromine number of 83.1.

EXAMPLE 6

Following the procedure of Example 5, a solid product is prepared from acetaldehyde and diacetophenone acrylamide in a 1.7:1 molar ratio. The maximum final temperature is 121° C.

EXAMPLE 7

A mixture of 2535 parts of diacetone acrylamide, 841 parts of 91% paraformaldehyde (1.7:1 mole ratio of formaldehyde to diacetone acrylamide) and 30 parts of 87% potassium hydroxide (1.83 mole percent based on formaldehyde) is heated under nitrogen, with stirring, to a maximum final reaction temperature of 121° C., with volatile materials being removed by distillation. The product is a light yellow brittle solid.

EXAMPLE 8

Following the procedure of Example 7, a solid product is prepared from 3045 parts of the product of Example 1, 775 parts of diacetone acrylamide (1.7:1 mole ratio of formaldehyde to diacetone acrylamide) and a solution of 30 parts of 87% potassium hydroxide (2.59 mole percent based on formaldehyde) in 70 parts of water. The maximum final temperature is 148° C.

EXAMPLE 9

Following the procedure of Example 5, a solid product is prepared from 3045 parts of the product of Example 1, 775 parts of diacetone acrylamide (1.7:1 mole ratio of formaldehyde to diacetone acrylamide), and a solution of 20 parts of 87% potassium hydroxide (1.73 mole percent based on formaldehyde) in 80 parts of water. The potassium hydroxide solution is added in two portions, the first at 60° C. and the second at 69° C. The maximum final temperature is 126° C. The product is a nearly clear, yellow solid.

EXAMPLE 10

A mixture of 459 parts of water, 435 parts of diacetone acrylamide and 255 parts of 91% paraformaldehyde is heated to 48° C. and a solution of 1.32 parts of 87% potassium hydroxide in 11.7 parts of water is added. Heating and stirring under nitrogen are continued as an additional two increments of potassium hydroxide are added, the first at 49° C. and the second at 52° C. An additional 300 parts of diacetone acrylamide is added and heating and stirring are continued, with four additional portions of potassium hydroxide being added at 60° C., 65° C., 74° C. and 82° C., respectively, for a total of 15.8 parts of potassium hydroxide (3.17 mole percent based on formaldehyde). Heating and stirring are continued to a final maximum temperature of 121° C. When all volatile materials have been removed, the reaction mass is allowed to cool. The solid product contains 6.20% nitrogen.

The compositions of this invention have uses similar or identical to those described in the aforementioned U.S. Pat. 3,518,326 and Reissue Pat. 27,328. Thus, they may be used to prepare molding powders as described in Examples 12–43 of said patents, or to replace unsaturated polyester resins in reinforced mats and laminates as disclosed in Examples 44-46 thereof.

The preparation of molding powders from the compositions of this invention is illustrated by a series of runs in which 470 parts of such a composition is combined with 10 parts of t-butyl perbenzoate and 19 parts of zinc stearate and the mixture is blended to a fine powder. To 450 parts of the resulting masterbatch are added 132 parts of titanium dioxide and 738 parts of calcium metasilicate to produce a molding powder. This powder is then milled at 65-77° C. and is molded at 148-155° C. and 5000 p.s.i. pressure to produce samples to be tested for flexural strength (ASTM D790). The following flexural strength results were obtained.

| Thermosetting composition: | Average flexural strength, p.s.i. |
|---|---|
| Product of Example 3 | 6000 |
| Product of Example 4 | 5300 |

What is claimed is:

1. In a method for preparing a water-insoluble thermosetting resinous composition of matter by reacting reagents A an B, wherein reagent A is a substituted acrylamide of the formula

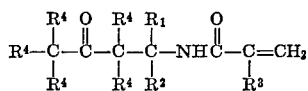

wherein each $R^4$ is individually hydrogen or a hydrocarbon or substituted hydrocarbon radical, at least one $R^4$ being hydrogen; each of $R^1$ and $R^2$ is hydrogen or a hydrocarbon or substituted hydrocarbon radical; and $R^3$ is hydrogen, halogen or a lower alkyl or substituted lower alkyl radical; with the proviso that the substituents on said substituted radicals do not alter significantly their character or reactivity; and reagent B is at least one of (1) an aliphatic aldehyde containing no more than 4 carbon atoms and (2) a water-soluble composition prepared by reacting said aldehyde with reagent A at a temperature below about 100° C. in the presence of an alkaline reagent and in a diluent comprising water, an organic liquid which is a solvent for the reactants or the product of said reaction or both, or a mixture of said diluents:

the molar ratio of reagent B to reagent A being such that at least one mole of said aldehyde is available per mole of said substituted acrylamide;

the improvement which comprises heating a mixture comprising said reagents A and B at a temperature high enough to effect substantial liquefaction of the reaction mixture, for a period of time sufficient to effect removal of water and substantially all other volatile components therefrom by distillation.

2. A method according to claim 1 wherein reagent B is formaldehyde or a water-soluble reaction product of formaldehyde with reagent A.

3. A method according to claim 2 wherein each of $R^1$ and $R^2$ is a lower alkyl radical and $R^3$ is hydrogen or methyl.

4. A method according to claim 3 wherein each $R^4$ is hydrogen, each of $R^1$ and $R^2$ is methyl, and $R^3$ is hydrogen.

5. A method according to claim 2 wherein the reaction is effected in the presence of an alkaline reagent.

6. A method according to claim 5 wherein the reaction temperature is below about 100° C. during addition of said alkaline reagent.

7. A method according to claim 6 wherein each of $R^1$ and $R^2$ is a lower alkyl radical and $R^3$ is hydrogen or methyl.

8. A method according to claim 7 wherein each $R^4$ is hydrogen, each of $R^1$ and $R^2$ is methyl, and $R^3$ is hydrogen.

9. A method according to claim 2 wherein the maximum temperature of the reaction mixture is about 200° C.

10. A method according to claim 9 wherein each of $R^1$ and $R^2$ is a lower alkyl radical and $R^3$ is hydrogen or methyl.

11. A method according to claim 10 wherein each $R^4$ is hydrogen, each of $R^1$ and $R^2$ is methyl and $R^3$ is hydrogen.

References Cited
UNITED STATES PATENTS

| 3,518,326 | 6/1970 | Frosberg | 260—828 |
| 3,277,056 | 10/1966 | Coleman | 260—63 |
| Re. 27,328 | 4/1972 | Frosberg | 260—828 |

LESTER L. LEE, Primary Examiner

U.S. Cl. X.R.

260—89.7 R